United States Patent [19]

Nakamura et al.

[11] 4,079,385
[45] Mar. 14, 1978

[54] CAMERA SYSTEM

[75] Inventors: Zenzo Nakamura, Urawa; Tokuichi Tsunekawa, Yokohama; Tetsuya Taguchi, Kawasaki; Masanori Uchidoi, Yokohama; Hiroshi Aizawa, Machida; Takashi Uchiyama, Yokohama, all of Japan

[73] Assignee: Canon Kabushiki Kaisha, Tokyo, Japan

[21] Appl. No.: 614,644

[22] Filed: Sep. 18, 1975

[30] Foreign Application Priority Data

Sep. 20, 1974 Japan .............................. 49-108355
Sep. 26, 1974 Japan .............................. 49-111283

[51] Int. Cl.² ............................................. G03B 7/08
[52] U.S. Cl. ...................................... 354/23 R; 354/31
[58] Field of Search .................. 354/23 R, 24, 26, 29, 354/31, 36, 38, 27, 32, 33, 43, 50, 51, 48, 60 R, 127, 139, 145, 149, 219; 356/221; 250/214 P

[56] References Cited

U.S. PATENT DOCUMENTS

| 3,326,103 | 6/1967 | Topaz | 354/50 X |
| 3,511,144 | 2/1968 | Götze | 354/29 X |
| 3,518,927 | 7/1970 | Mehlitz et al. | 354/60 X |
| 3,716,752 | 2/1973 | Iwata | 354/145 X |
| 3,762,286 | 10/1973 | Hasegawa | 354/31 |
| 3,812,499 | 5/1974 | Hayashi et al. | 354/31 |
| 3,846,806 | 5/1974 | Yata et al. | 354/31 |
| 3,884,584 | 5/1975 | Tsunekawa et al. | 354/31 X |

Primary Examiner—L. T. Hix
Assistant Examiner—William B. Perkey
Attorney, Agent, or Firm—Toren, McGeady and Stanger

[57] ABSTRACT

A selector circuit interrupted by an electrical signal from an attachment selectively mounted on the camera body and is connected in the light receiving circuit as well as the exposure determining circuit provided in the camera. When the above mentioned unit is mounted on the camera the exposure determining circuit provided in the camera is automatically connected from the light receiving circuit to the output terminal of the unit by means of the selector circuit, so as to receive the exposure value signal on the unit and set the exposure value corresponding to the exposure value signal.

9 Claims, 15 Drawing Figures

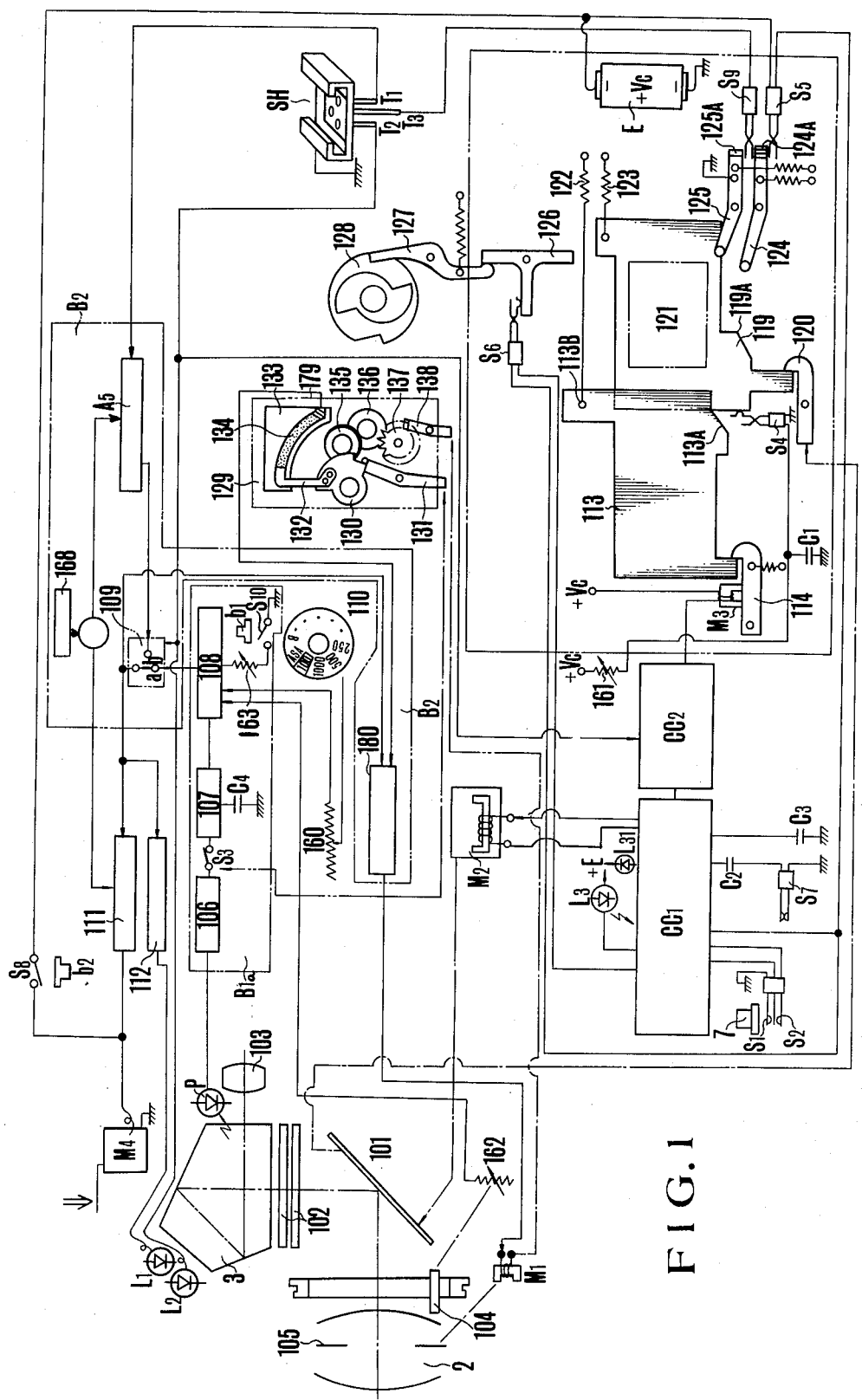
F I G. 1

CAMERA SYSTEM

BACKGROUND OF THE INVENTION:

1. Field of the Invention:

The present invention relates to a camera exposure control device, particularly to a camera system in which electrical signals from various kinds of the attachments selectively mounted on the camera body automatically set the exposure control means in the camera.

2. Description of the Prior Art:

A conventional automatic exposure control device for a camera includes a mean light measuring system or a central light measuring system in order to raise the accuracy for obtaining the proper exposure. When taking a photograph with great differences in brightness between the object and the background as in the case of backlight it is impossible for the photographer to automatically obtain a proper exposure of the specified portion desired by the photographer without performing several manual operations. For example, it is often necessary to increase the exposure amount by several steps from the exposure obtained by a mean light measurement and possible to disengage the automatic exposure control device. Thus it is not an easy task for an unexperienced person to obtain a proper exposure.

SUMMARY OF THE PRESENT INVENTION

The purpose of the present invention is to offer a camera system in accordance to which anybody can automatically and easily obtain the proper exposure of the object to be photographed even if the object to be photographed (for example persons or flowers) is in a backlighted state.

Another purpose of the present invention is to offer a camera system in accordance to which an indication device capable of indicating the brightness of the object to be photographed in the backlight state is provided in the camera.

Further another purpose of the present invention is to offer a camera system in accordance to which the proper exposure can automatically obtained even when the attachment unit such as remote control unit is mounted on the camera.

Further other purposes of the present invention will be disclosed from the following explanations to be made in detail in accordance with the accompanying drawings.

BRIEF DESCRIPTION OF THE DRAWINGS:

FIG. 1 shows the basic composition of a camera forming part of a system embodying the present invention.

DESCRIPTION OF THE PREFERRED EMBODIMENTS

Figure 2:
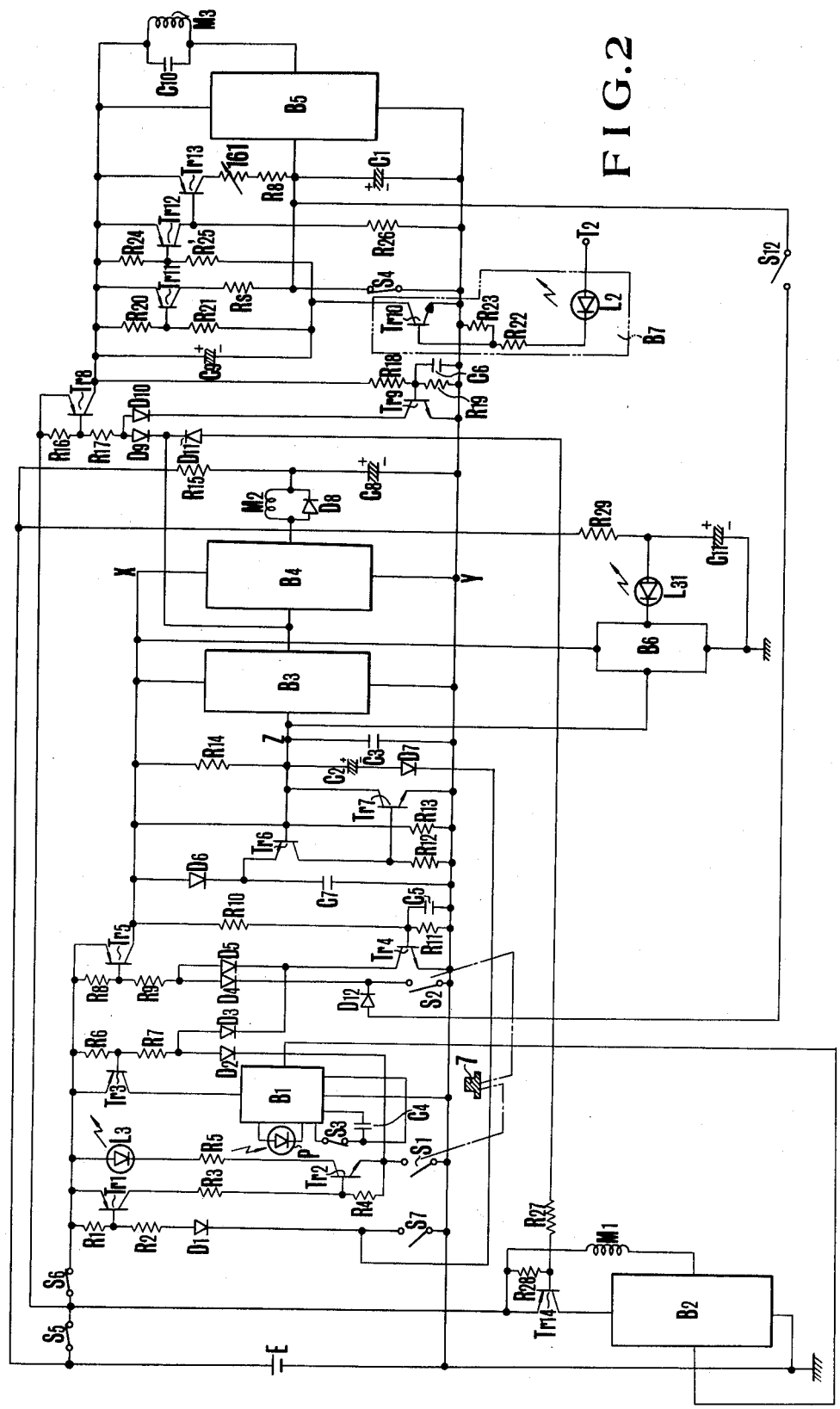
FIG. 2 shows electrical circuit details of blocks shown in FIG. 1.

In FIG. 1, member 101 is the quick return mirror, 102 and 103 the Fresnel lens forming the view finder optical system of the conventional single reflex camera and the focus plate as well as the eye piece lens, P the light sensing element consisting of a photo-voltaic cell provided above the eye piece lens for producing an electrical signal corresponding to the mean value of the brightness of the object to be photographed, $L_1$ and $L_2$ the illuminant diodes for alarm indication provided in the neighborhood of the pentagonal prism, and 104 and the signal member provided on the face of the rear end of the interchangeable lens 2 and presenting a length along the direction of the optical axis whose value corresponds with the maximum aperture value of the lens, in other words, the signal pin for compensating the error which takes place at the time of the light measurement with the maximum aperture value of the automatic diaphragm device 105 provided in the interchangeable lens in a way of TTL light measurement. Member 162 is a variable resistance whose value is automatically set by means of the signal member 104, $B_{1a}$ the light measuring circuit block consisting of the light measuring circuit 106 whose input is connected with the light sensing element P, the storage circuit 107 to be connected with the above mentioned light measuring circuit 106 by means of the storage switch $S_3$ opened and closed by the magnet $M_2$ to be explained later and the operation circuit 108, whereby the output of the block $B_{1a}$ is connected with the automatic exposure determining circuit block $B_2$ through the photographic mode switching over switch 109. The contact a of the switching over switch 109 is intended for the day light photographic mode, while the contact b is intended for the flash light photographic mode as well as the spot light measurement mode or remote control mode. Reference character $b_1$ of the light measuring circuit block $B_{1a}$ denotes the K value button to be operated at the time of taking a special photograph with an improper exposure value intentionally, whereby its detailed explanation is omitted. Member 110 is the shutter dial by means of which the value of the variable resistance 160 is adjusted so as to deliver the shutter time information into the operation circuit 108. The determining circuit block $B_2$ is connected with the indication driving circuit 111 whose input terminal is connected with the output terminal of the operation circuit 108 through the switching over switch 109 and with the alarming circuit 112. The above mentioned circuits 111 and 112 are respectively connected with the meter $M_4$ and the illuminating diode $L_1$ so that the aperture value at the time of taking a photograph is indicated by the pointer of the meter $M_4$ in advance while in case the proper exposure can not be obtained with the set shutter time, the illuminating diode $L_1$ lights up so as to indicate the over-exposure or the under-exposure. Member $M_1$ is the magnet to be connected with the output terminal of the determining circuit $B_2$ so as to control the aperture determining mechanism. $CC_1$ is the control circuit presenting the control blocks $B_3$, $B_4$ and $B_6$ (FIG. 2), namely the control block ($B_3$) for camera actuating magnet $M_2$, the monostable circuit block ($B_4$) and the indication control block ($B_6$), whereby the above mentioned control circuit $CC_1$ is connected with the illuminating diodes $L_3$ and $L_{31}$. Reference character $CC_2$ denotes the control circuit presenting the control block $B_5$ and $B_7$ to be explained later (FIG. 2). $M_3$ is the holding member control magnet for holding the rear shutter plane 113, being connected with the output of the control circuit block $B_5$. $S_1$ and $S_2$ are the switches in functional engagement with the shutter release button 7, whereby the switch $S_1$ is closed when the release button 7 is pushed down to the first step, the switch $S_2$ is closed when the release button is pushed down to the second step while both of them $S_1$ and $S_2$ are opened when the button 7 assumes the initial position. Member $S_7$ is the switch so designed as to be closed in functional engagement with a self-timer not shown in the drawing, 119 the front shutter plane and 120 the front shutter plane holding member in functional engagement with the driving mechanism of the mirror 101 similarly to the conventional single reflex camera so as to release the engagement with the front shutter plane 119 at the time point when the mirror 101 is raised. Member 121 is the exposure frame, 113 the rear shutter plane, 122 the rear shutter plane driving spring, 123 the front shutter plane driving spring, 124 the switching over lever displaceable in functional engagement with the cam part 119A of the front shutter plane 119 and 125 the switching over lever displaceable in functional engagement with the cam part 113A of the rear shutter plane, whereby the switches $S_5$ and $S_9$ are respectively provided on the folded ends 124A and 125A of the lever 124 and 125. Member 126 is the switching over lever for bringing the switch $S_6$ out of the switched on state into the switched off state, being rotated by the front end 113 of the rear shutter plane 113, 127 the lever whose one end is engaged with the switching over lever 126 and whose other end is engaged with the cam 128 rotatable by 180° in functional engagement with the charge mechanism (not shown in the drawing). 129 is the aperture determining mechanism provide on the side face of the mirror box (not shown in the drawing) provided on the camera body, 130 the sector gear being excited clockwise by means of a spring not shown in the drawing, whereby the end face is prevented from rotating by means of a holding lever 131. 132 is the slide member fixed on the sector gear, being so designed as to be in slidable contact on the resistance layer cemented on the insulation plate 133 and to form a variable resistance 179 connected with the comparator 180 which forms the determining circuit $B_2$. Members 135 – 137 are the step up gear group composing a governer gear, whereby on the last wheel 137 a holding lever 138 whose one end is attracted by the magnet $M_1$ and whose other end prevents the wheel 137 from rotation. Hereby the sector gear drives the diaphragm presetting circular cam piece (not shown in the drawing) provided in the interchangeable lens 2 by means of the link mechanism not shown in the drawing, whereby its detailed explanation is omitted, having nothing to do directly with the present invention. Member $S_8$ is the switch which is closed in functional engagement with the button $b_2$ for checking the current source voltage, and E the current source. The members 168 and $A_5$ are the same as those shown and described with respect to FIG. 3.

FIG. 2 shows the circuit composition shown in FIG. 1 by means of a concrete circuit for explaining the circuit composition as a whole, whereby the same electrical elements as shown in FIG. 1 present the same figures, for example, the switches $S_1 - S_{10}$, the condenser $C_1 - C_{10}$, the magnets $M_1 - M_3$ and so on. In FIG. 2, $R_1$ and $R_2$ are the voltage dividing resistances, $D_1$ the non return diodes, whereby the base of the transistor $Tr_1$ is connected with the voltage dividing point of the voltage dividing resistance. Member $Tr_2$ is the diode driving transistor whose base is connected with the voltage dividing point of the voltage dividing resistance $R_3$ and $R_4$ being connected with the collector electrode of the transistor $Tr_1$ and in whose collector circuit the illuminating diode $L_3$ for indicating the setting of the self timer is connected, $C_4$ the object brightness value storing condenser connected in the storage circuit 107 and $S_3$ the storage switch so designed as to be opened immediately before the mirror 101 operated in functional engagement with the excitation of the magnet $M_2$ for releasing the mirror quick return mechanism not shown in the drawing is raised. The value of the brightness of the object to be photographed immediately before the raise of the mirror 101 is stored in the storage condenser $C_4$ as an electrical signal. $Tr_5$ is the transistor whose base is connected with the voltage dividing point of the voltage dividing resistances $R_8$ and $R_9$, being connected with the switch $S_2$ and the collector of the holding transistor $Tr_4$ through the non return diodes $D_4$ and $D_5$ connected parallel to each other. This transistor $Tr_5$ serves as a current supply switch for supplying the current to the control block $B_3$ and $B_4$ only in case of necessity and is closed when the switch $S_2$ is closed by pushing the shutter button 7 down to the second step so as to bring the transistor $Tr_4$ in the switched on state through the resistance. By bringing the transistor $Tr_4$ in the switched on state the base potential of the transistor $Tr_5$ is kept at low level so that the transistor $Tr_5$ is kept in the switched on state even if the switch $S_2$ is opened by the return of the button 7 into the initial position. $R_{14}$ and $C_3$ are respectively the resistance and the condenser forming a delay circuit for delaying the actuation of the camera during the light measurement especially when the repeated photographs are taken, whereby their impedance values are so chosen as to obtain a time constant of about 10 m sec. Component $C_2$ is the self timer setting condenser connected parallel to the components condenser $C_3$ and to the timer set switch $S_7$ through the non return diode $D_7$, $Tr_6$ and $Tr_7$ the transistors for discharging the condensers $C_2$ and $C_3$, so as to bring these condensers $C_2$ and $C_3$ in the reset state and $C_7$ the condenser for determining the discharging time. $C_8$ and $R_{15}$ are respectively the condenser in which the charge for quickly exciting the actuating magnet $M_2$ is to be stored and the charging resistance. The output of the control block $B_3$ is connected to the base of the transistor $Tr_{14}$ throught the diode $D_{11}$ and the resistance $R_{27}$. Hereby the transistor $Tr_{14}$ is the current supply control block being connected in the current supply circuit of the control block $B_2$. The indication control block $B_6$, whose input is connected with the condensers $C_2$ and $C_3$ is the control block for predicting the operation of the self-timer, consisting of a conventional switching circuit whose conductivity level is a little lower than the value of a conventional switching circuit (not shown in the drawing) composing the input part of the control block $B_3$. Components $C_{11}$ and $R_{29}$ are respectively the condenser for storing the energy for lighting the illuminating diode $L_{31}$ and the charging current control resistance. The switch $S_4$ is the starting switch which is closed by means of the end face of the front shutter plane 119 of the shutter shown in FIG. 1 before the front shutter plane 119 starts to run and opened at the same time with its start, and $C_1$ the shutter time setting condenser forming a time constant circuit together with the variable resistance 161 whose value is set by means of the shutter dial 110 shown in FIG. 1. Components $Tr_8$ and $Tr_9$ are the transistors for controlling the current supply to the control block $B_5$, while the base of the transistor $Tr_8$ is connected with the voltage dividing point of the voltage dividing resistance $R_{16}$ and $R_{17}$ and at the same time, with the collecter of the transistor $Tr_9$ through the diode $D_{10}$. The base of the transistor $Tr_9$ is connected to the voltage dividing point of the voltage dividing resistances $R_{18}$ and $R_{19}$ so that the transistor $Tr_8$ is brought in the switched on state, namely the current supply state, bringing the transistor $Tr_9$ into conductive state and lowering the base level of the transistor $Tr_8$, so as to keep the transistor $Tr_8$ in the switched on state. Component $L_2$ is the illuminating diode connected with the switching over signal terminal $T_2$ provided on the hot shoe of the camera, being connected with the neon tube circuit connected with the principal capacitor of the flash light device C to be explained later in such a manner that when the charging voltage of the principal capacitor at the side of the flash light device reaches a certain determined value, the illuminating diode $L_2$ lights whereby the transistor $Tr_{10}$ whose base is connected with the diode is brought in the conductive state. The control block $B_7$ is the control circuit block for generating a control signal for converting the shutter time into that for the flash light photography by means of the charging completion signal of the flash light device C to be explained later whereby the collecter of the transistor $Tr_{10}$ is connected with the transistor $Tr_{11}$. When in consequence the transistor $Tr_{10}$ is brought in the switched on state the transistor $Tr_{11}$ is also brought in the switched state in such a manner that the resistance Rs is connected in series with the condenser $C_1$. On the other hand by turning the transistor $Tr_{10}$ on the transistors $Tr_{11}$ and $Tr_{12}$ are turning on and $Tr_{13}$ is switched off so that the shutter time is set at such suitable for the flash light photography, say 1/60 sec., by means of the time constant circuit consisting of the resistance Rs and the condenser $C_1$.

The condenser $C_9$ connected with the transistor $Tr_{10}$ is the condenser which is charged so as to delay the return of the shutter time for the one for the flash light photography to the one for the day light photography when the flash light device C to be explained later in order to prevent the charge completion signal from becoming instable instantly.

Figure 3:
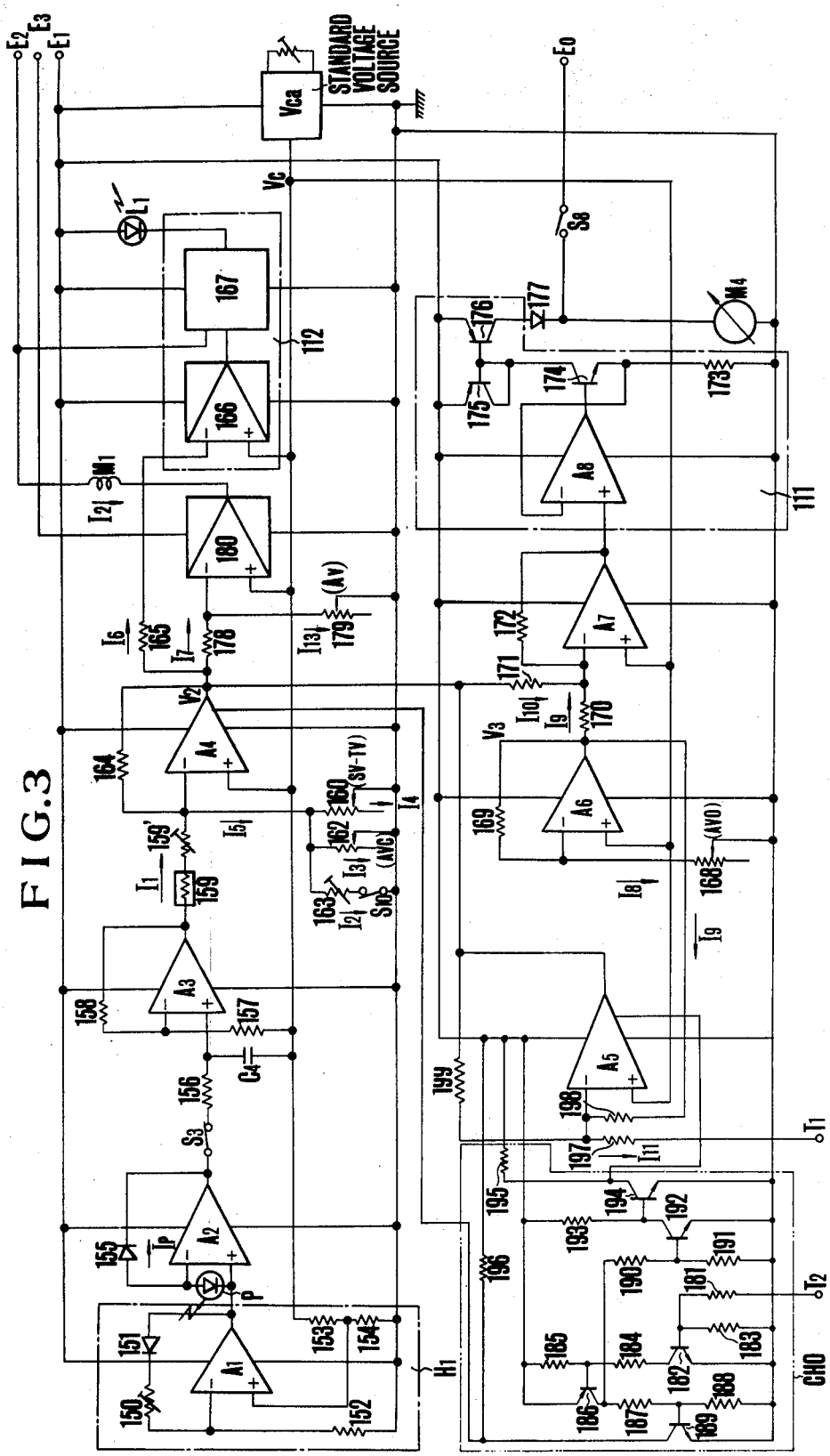
FIG. 3 shows electrical circuit details of portions such as $B_1$ and B of the circuit in FIG. 2.

The control block $B_1$ and $B_2$ shown in FIG. 2 consist of the circuit as shown in FIG. 3. Below the circuit shown in FIG. 3 will be explained. Members $A_1 - A_8$ in FIG. 3 are the operational amplifiers, whereby $A_4$ and $A_5$ receive the signal from the flash light device to be explained later through the switching over signal terminal $T_2$ provided on the hot shoe of the camera. Component $H_1$ is the temperature compensating block for the amplifier $A_2$, whose output terminal is connected with the non inversed input terminal of the amplifier $A_2$. Between the input terminals of the amplifier $A_2$ a light sensing element P for producing as output the electrical signal corresponding to the mean value of the brightness of the object to be photographed is connected while between the input terminals of the amplifier $A_2$ the diode 155 for logarithmically compressing the electrical signal from the above mentioned light sensing element P is connected. The output terminal of this amplifier $A_2$ is connected with the memory capaciter $C_4$ through the above mentioned storage switch $S_3$ as well as the resistance 156 for preventing flickering. With this capaciter $C_4$ the amplifier $A_3$ having a high input impedance is connected. With the inverted input terminal of this amplifier $A_3$ the gain adjusting resistors 157 and 158 are connected while with the output terminal the inversed input terminal of the operational amplifier $A_4$ is connected through the temperature compensating resistance 159 as well as the current adjusting resistance 159'. With the inversed input terminal of this amplifier $A_4$ the resistance 160 whose value corresponds with the difference between the shutter speed Tv and the film speed Sv, i.e. (Sv − Tv), the resistance 162 on which the compensating amount Avc for totally opened aperture is set and the resistance on which the exposure amount compensation information is set are connected whereby beween the inversed input terminal and the output terminal of this amplifier $A_4$ the gain adjusting resistance 164 is connected. In consequence, at the output terminal of the amplifier $A_4$ a voltage corresponding to the sum of the signal currents $I_1$ and $I_5$ shown in the drawing, namely the voltage $V_2$ corresponding to the diaphragm step number is produced. The output terminal of this amplifier $A_4$ is connected with the input terminal of the above mentioned warning circuit through the resistance 165. With this warning circuit 112 the illuminating diode $L_1$ for warning is connected as mentioned above, whereby this diode $L_1$ flickers by means of the broken signal from the oscillation circuit 167 when the diaphragm signal $V_2$ from the amplifier $A_4$ goes out of the operation range of the diaphragm control device of the camera. Component 166 is the comparater circuit connected between the amplifier $A_4$ and the oscillation circuit 167. Member $A_6$ is an operational amplifier with whose inversed input terminal the resistance 168 whose value corresponds to the maximum aperture value of the photographic lens to be used (not shown in the drawing) and the gain adjusting resistance 169 are connected. The output terminal of the amplifier $A_6$ is connected with the inversed input terminal of the operational amplifier $A_7$ through the resistance 170 whereby further the output terminal of the amplifier $A_4$ is connected with the inversed input terminal of the operational amplifier $A_7$ through the resistance 171. In consequence at the output terminal of the amplifier $A_7$ a voltage corresponding to the aperture value ($|Av|$) which is the signal corresponding to the diaphragm step number $V_2$ and to the maximum aperture value Avo is produced. The output terminal of this amplifier $A_7$ is connected with the input terminal of the indication driving circuit 111 explained in accordance with FIG. 1. The indication driving circuit 111 includes the resistance 173 beside the PnP transistors 175 and 176 as well as the nPn transistor 174. The output terminal of the indication driving circuit 111 is connected with the aperture value indication meter $M_4$ explained in accordance with FIG. 1 through the non-return diode 177. The light measuring circuit block $B_1$ consists of the above mentioned elements 150 − 164, 168 − 172.

Below the block $B_2$ shown in FIG. 2 will be explained in accordance with the circuit shown in FIG. 3. This block $B_2$ is the control part for closing the diaphragm of the photographic lens down to the proper position, comparing the signal voltage $V_2$ corresponding to the above mentioned diaphragm step number with the diaphragm step number information (Av) from the photographic lens. The control block $B_2$ consists of the elements 178 – 180, presenting the comparater 180. The resistor 178 connects one input terminal of this comparater 180 with the output terminal of the operational amplifier $A_4$ which produces the signal voltage $V_2$ corresponding to the diaphragm step number this input terminal is also connected to the resistance 179 whose value corresponds to the diaphragm step number of the photographic lens used. The output terminal of this comparater 180 is connected to the magnet $M_1$ as shown in FIG. 1. This comparater 180 operates so as to interrupt the current supply to the magnet when the current $I_7$ through the resistance 178 and the current $I_{13}$ through the resistance 179 reach a certain determined value relative to each other. When the current supply to the magnet is interrupted by the comparater 180, the aperture of the photographic lens is set at a certain predetermined value.

Component CHO is the change over circuit presenting a voltage dividing resistance 181 whose one terminal is connected with the change over signal terminal $T_2$ provided on the hot shoe of the camera and whose other terminal is connected with the base electrode of the nPn transistor 182, the voltage dividing resistance connected between the resistance 181 and the earth terminal, the resistances 184, 185 being connected with the collector electrode of the transistor 182 so as to form a voltage dividing circuit, the PnP transistor 186 whose base is connected with the output of the voltage dividing circuit, the resistances 187 and 188 for forming a voltage dividing circuit, the nPn transistor 189 whose base is connected with the output terminal of the voltage dividing circuit 187 and 188, the voltage dividing circuit 190, 191 being connected with collector electrode of the transistor 186, the nPn transistor 192 whose base is connected with the output terminal of this voltage dividing circuit 190, 191, the nPn transistor 194 whose base is connected with the collector electrode of the transistor 192 and the resistances 195, 196 as well as 193 connected with the current source line $E_1$ which is connected with the collector of the transistor $Tr_3$ shown in FIG. 2. The collector electrode of the transistor 189 is connected with the operational amplifier $A_4$. When thus the transistor 189 is brought in the conductive state, the amplifier $A_4$ is brought in the non-operable state.

Figure 4D:
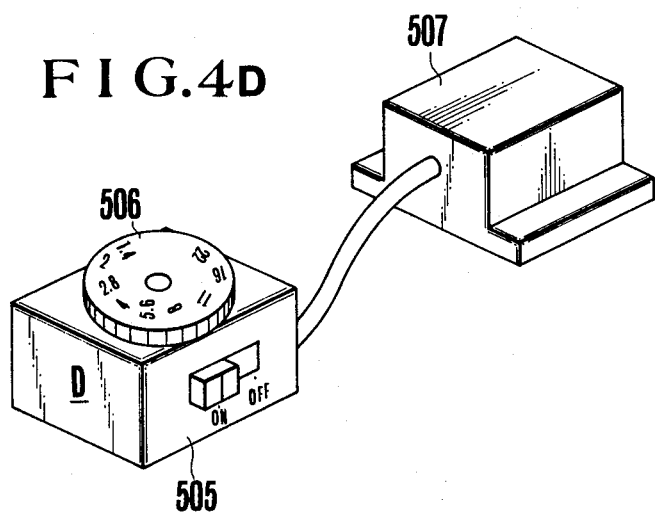
FIG. 4 shows the appearances of various adapters.
Figure 4E:
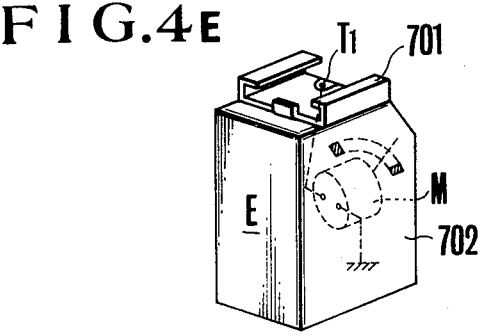
Figure 4F:
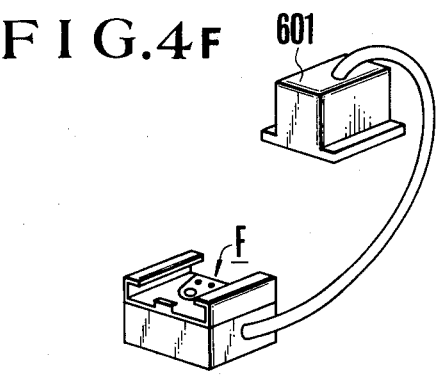

On the other hand, the collector electrode of the transistor 194 is also connected with the operational amplifier $A_5$. Thus when this transistor 194 is brought in the nonconductive state, the amplifier $A_5$ is brought in the operable state in such a manner that the signal applied to the terminal $T_1$ provided on the hot shoe of the camera and the signal obtained from the amplifier $A_6$ so as to correspond to the maximum aperture signal (Avo) are operated in the amplifier $A_5$ so as to give out the operation result. Hereby the output terminal of this amplifier $A_5$ is connected with the input terminal of the above mentioned comparater 180 forming the control block $B_2$ through the resistance 178. Component Eo is the current source line connected with the positive electrode of the current source E shown in FIG. 2, $E_2$ the current source line connected with the contact point of the switches $S_5$ and $S_6$ shown in FIG. 2, $E_3$ the current source line connected with the collector of the transistor $Tr_{14}$ shown in FIG. 2 and Vca the constant voltage circuit. On the cameras shown in FIGS. 1 to 3, the above mentioned hot shoe is provided, whereby this hot shoe presents as shown in FIG. 4, the aperture information terminal $T_1$, the change over signal terminal $T_2$, the terminal $T_3$ for synchronization contact, being provided on the upper part of the camera body. FIG. 4B is the appearance of the spot meter unit, FIG. 4C the appearance of the flash light device to be explained later, FIG. 4D the appearance of the remote control unit, FIG. 4E the appearance of the meter box to be used in combination with the spot meter unit B shown in FIG. 4B, and FIG. 4F the appearance of the extention unit F.

Below the composition of the various attachments mentioned above will be explained. Firstly the spot meter unit B will be explained in accordance with FIG. 4B.

In FIG. 4B, component 201 and 202 are respectively the shutter time ring and ASA sensitivity setting ring provided on the lens barrel, 203 the control ring for adjusting for under-exposure and the over-exposure and 204 the current supply.switch ring. Inside the lens barrel supporting these various rings are the view field mask for narrowing the light receiving angle and the view finder for observing the measure part of the object to be photographed. Their detailed explanations are omitted here, having nothing to do directly with the present invention.

Figure 5:
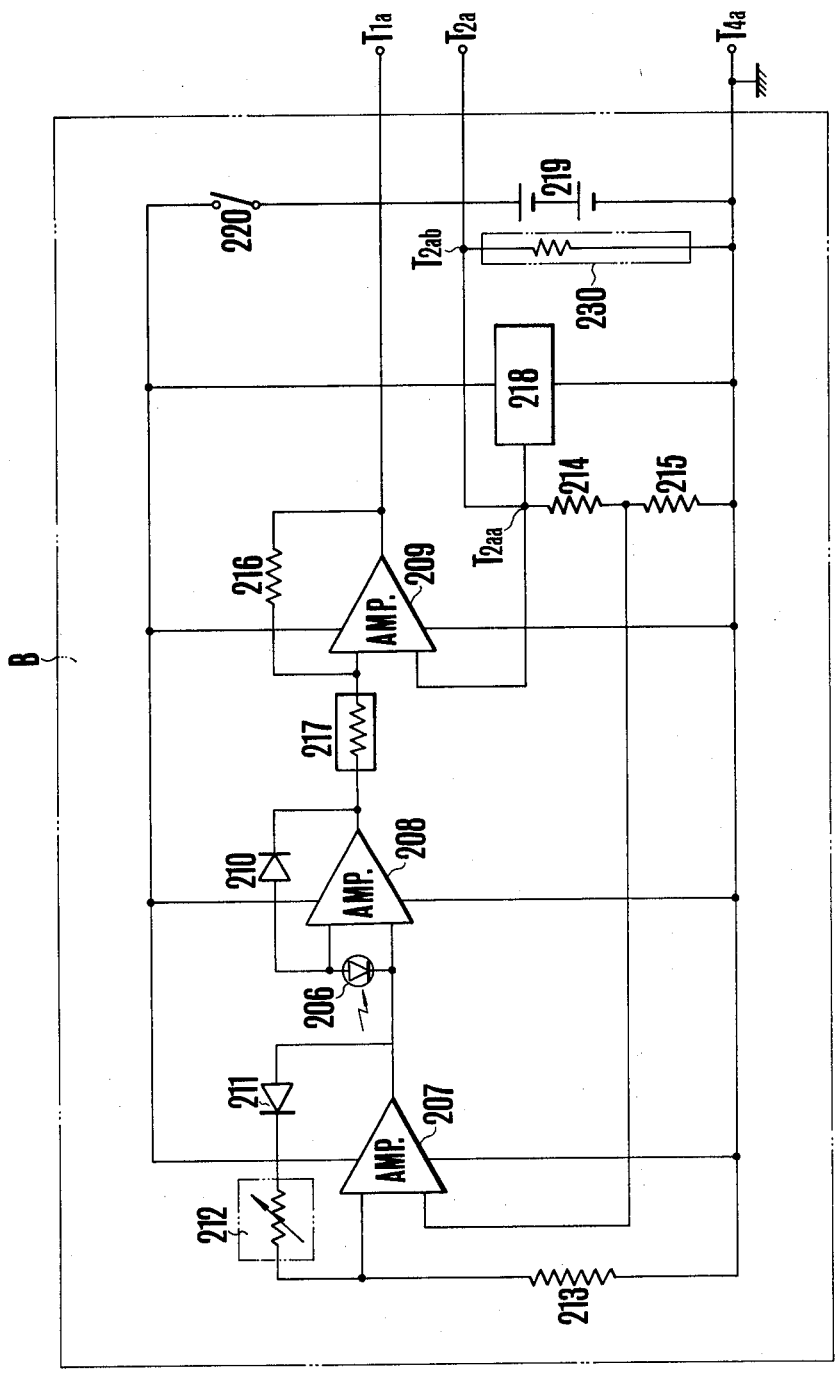
FIG. 5 shows a concrete electrical circuit of the spot meter unit shown in FIG. 4B.

Component 205 is the shoe foot to be adapted to the hot shoe HS provided at the side of the camera body. The above mentioned spot meter B unit has the elements as shown in FIG. 5. Namely in FIG. 5, component 206 is the light sensing element such as photo transistor, silicon photocell and so on receiving a light beam from a certain determined part of the object to be photographed so as to produce the electrical signal corresponding to the light beam from the certain determined part, 207, 208 and 209 the operational amplifier, 210 the logarithmically compressing diode, 211 the temperature compensating diode, 212 the variable resistance with whose sliding element the setting rings 201 and 202 are engaged through addition mechanism not shown in the drawing, 213 – 216 the resistances, 217 the temperature compensating resistance (with a positive thermal coefficient in the present circuit), 218 the constant voltage circuit, 219 the current source and 220 the main switch closed or opened by the rotation of the ring 204 shown in FIG. 4B.

Figure 4A:
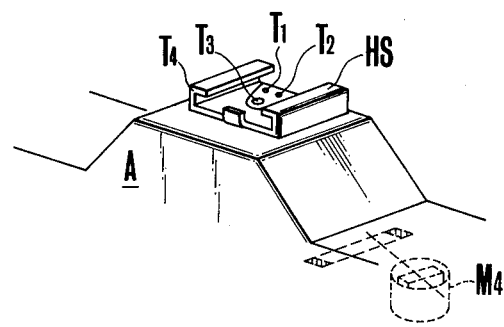
Figure 4B:
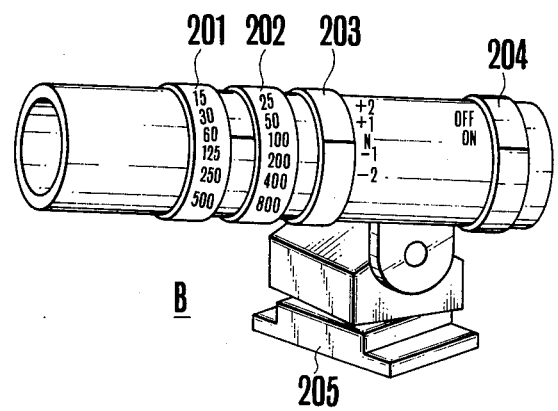

The output terminal of the operational amplifier 209 is connected with the terminal $T_{1a}$ connectable with the aperture information terminal $T_1$ of the hot shoe HS shown in FIG. 4A, while the output terminal of the constant voltage circuit 218 is connected with the terminal $T_{2a}$ connectable with the change over signal terminal $T_2$ of the above mentioned hot shoe HS. Hereby the terminals $T_{1a}$, $T_{2a}$ and $T_{4a}$ are all provided on the above mentioned shoe foot.

The apparatus of FIGS. 1 – 5 operates as follows. When the main object to be photographed such as a person, flowers and so on is extremely dim compared to the background, the spot meter unit B is mounted on the camera body A. In this way, the terminal $T_{1a}$ provided on the foot 205 of the spot meter unit B contacts the terminal $T_1$ of the hot shoe HS, while the earth or ground terminal $T_{4a}$ provided on the foot 205 is connected with the camera body. When the release button 7 is first pushed down the switch $S_1$ is closed, so as to form a closed circuit through current source E - switch $S_5$ - switch $S_6$ - resistor $R_6$ - resistor $R_7$ - diode $D_2$ - switch $S_1$ - current source E. This renders the transistor $Tr_3$ conductive so that a predetermined voltage is applied to the light measuring circuit block $B_1$ (FIG. 2). It is a matter of course that a given voltage is supplied by the current source line $E_1$. When the switch 220 is closed the output voltage of the constant voltage circuit 218 is applied to the terminal $T_{2a}$ in the spot meter unit B. Thus the base potential of the transistor 182 of the changing over or selector circuit CHO is high, and the transistor 182 becomes conductive. In consequence, the transistors 186 and 189 also become conductive state. When the transistor 189 is conductive the amplifier $A_4$ is placed in a non operable state so that the signal corresponding to the diaphragm step number produced at the output terminal of the amplifier $A_4$ is cut off. On the other hand, conductive transistor 186 turn on the transistor 192 of the selector circuit CHO which in turn turns off the transistor 194. In consequence, the amplifier $A_5$ is placed in its operable state. Hence when the spot meter unit is mounted on the camera body A the operational amplifier $A_4$ is interrupted by the selector circuit CHO, and the operational amplifier $A_5$ is made operational.

When the lens barrel of the spot meter unit B is directed at the desired part of the object to be photographed, the light beam produces an electrical signal in light sensing element 206 (FIG. 5), which signal is applied to the amplifier 208. In the other input terminal of the amplifier 208 receives other data such as the film speed set by the resistance 212 and the shutter time. Thus, the output terminal of the amplifier 208 exhibits a current output corresponding to the difference between the logarithmic value of the brightness information of the object to be photographed as a whole and the logarithmic value of the film speed as well as the shutter time, namely the logarithmic value of the aperture information ($|Av|$). This aperture information ($|Av|$) is applied to the amplifier $A_5$ through the terminal $T_1$ at the camera. Now, the current $I_7$ flowing into the one input terminal of the comparater 180 corresponds to the aperture value set on the spot meter unit B.

When at this time, the shutter button is pushed down further, the switch $S_2$ is closed. This turns on the transistor $Tr_5$ and turns off the transistor $Tr_7$. The capacitor $C_3$ of the time constant circuit consisting of the capacitor $C_3$ and the resistor $R_{14}$ now starts to charge. After an elapse of time determined by the time constant of the above mentioned time constant circuit $C_3 R_{14}$ the terminal voltage of the capacitor $C_3$ reaches a given potential at which the state of the control block $B_3$ is inverted. The control block $B_3$ now connects the cathode of the diode $D_{11}$ with the negative electrode of the current source. Thus the base of the transistor $Tr_{14}$ receives the voltage divided by the resistances $R_{27}$ and $R_{28}$ and the transistor $Tr_{14}$ is rendered conductive. A pre-determined voltage is now applied to the block $B_2$ by the current source E. Also inverting the output state of the control block $B_3$ produces a trigger pulse at the output terminal of the control block $B_4$, so that the magnet $M_2$ is no longer excited when the mirror 101 is raised. This releases the holding of the mirror driving mechanism (not shown in the drawing).

When the driving mechanism of the mirror 101 is released the holding lever 131 release the sector gear 130, and the slide member 132 starts to rotate clockwise. When the sector gear 130 has rotated until the value of the variable resistance 179 composed of the slide member 132 and the resistance 134 corresponds with the aperture information ($|Av|$) from the spot meter unit B, the magnet $M_1$ is no longer excited by the output signal of the comparator 180. The holding lever 138 now prevents the wheel 137 from rotating. In consequence the diaphragm preset mechanism (not shown in the drawing) of the photographic lens and in engagement with the sector gear 130 is at an aperture set position corresponding to the aperture information in the spot meter unit B. On the other hand, because the output of the control block $B_3$ has been inverted so the transistor $Tr_8$ is turned on. Now, a drive voltage is supplied to the control block $B_5$ from the current source E.

When the mirror 101 is raised, the holding member 120 is functional engagement with the driving mechanism of the mirror releases the front shutter plane 119. The spring 123 now draws the front shutter plane 119 so as to open the shutter. Thus before the shutter has been opened and while the mirror 101 is being raised the automatic diaphragm mechanism (not shown in the drawing) in the camera shuts the diaphragm 105 at the photographic lens down to the above mentioned preset position. Starting of the front shutter plane 119 causes the switch $S_4$ to open and the capacitor $C_1$ is charged through the resistance 161 on which the shutter speed is set.

After the elapse of the time corresponding to the shutter speed set on the shutter dial 110 the output of the control block $B_5$ is inverted so that the magnet $M_3$ is no longer excited. In consequence, the holding member 114 rotates clockwise so the rear shutter plane 113 starts to run and close the shutter. The switch $S_5$ is opened when the rear shutter plane 113 has totally closed the shutter. This turns off the transistors $Tr_5$, $Tr_8$ and $Tr_{14}$ for supplying the driving voltage to the control blocks so that the current supply to the control block is interrupted.

By mounting the spot meter unit B on the camera body A a certain determined voltage is supplied to the illuminating diode $L_2$ from the constant voltage circuit 218 of the spot meter unit B, whereby the voltage is so low that the transistors $Tr_{10}$, $Tr_{11}$ are kept in the non conductive state. In consequence the shutter speed assumes the value corresponding to the shutter speed set on the resistance 161 as mentioned above. The light sensing element 206 provided in the spot meter unit B can be provided so as to mainly receive the light beam from the central part of the object to be photographed.

Figure 9:
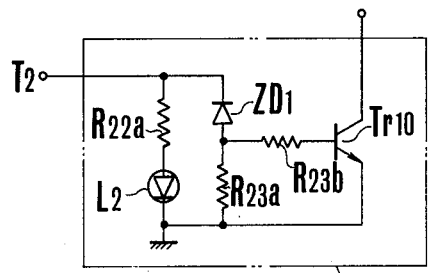
FIG. 9 shows a part of a variation of the circuit shown in FIG. 2.

When the spot meter unit B is not mounted on the camera body A the selector circuit does not operate, so that the aperture is determined as explained above by means of the aperture information from the amplifier $A_4$, while the shutter opening time is similarly determined by means of the shutter time set on the resistance 161. When the spot meter unit B is mounted on the camera body A as explained above the illuminating diode $L_2$ does not light up, whereby in order to light the diode $L_2$ it is sufficient to make the control block $B_7$ into $B_{7a}$ as is shown in FIG. 9. Reference character $T_2$ is the terminal $T_2$ shown in FIG. 2, $R_{22a}$ the resistance and $L_2$ the illuminating diode in FIG. 2, whereby the one terminal of the illuminating diode $L_2$ is connected with the each terminal being connected with the negative electrode of the current source E in FIG. 2. Component $ZD_1$ is the Zener diode, $R_{23a}$ and $R_{23b}$ the resistances, the $Tr_{10}$ the transistor shown in FIG. 2, whose emitter is connected with the earth terminal and whose collector is connected with the bases of the transistors $Tr_{11}$ and $Tr_{12}$ through the resistances $R_{21}$ and $R_{25}$ shown in FIG. 2. In this way, in case a low voltage signal is supplied from the terminal $T_{2a}$ of the spot terminal B to the terminal $T_2$, the diode $L_2$ lights up. Hereby it goes without saying that the transistor $Tr_{10}$ is in the conductive state.

Figure 6:
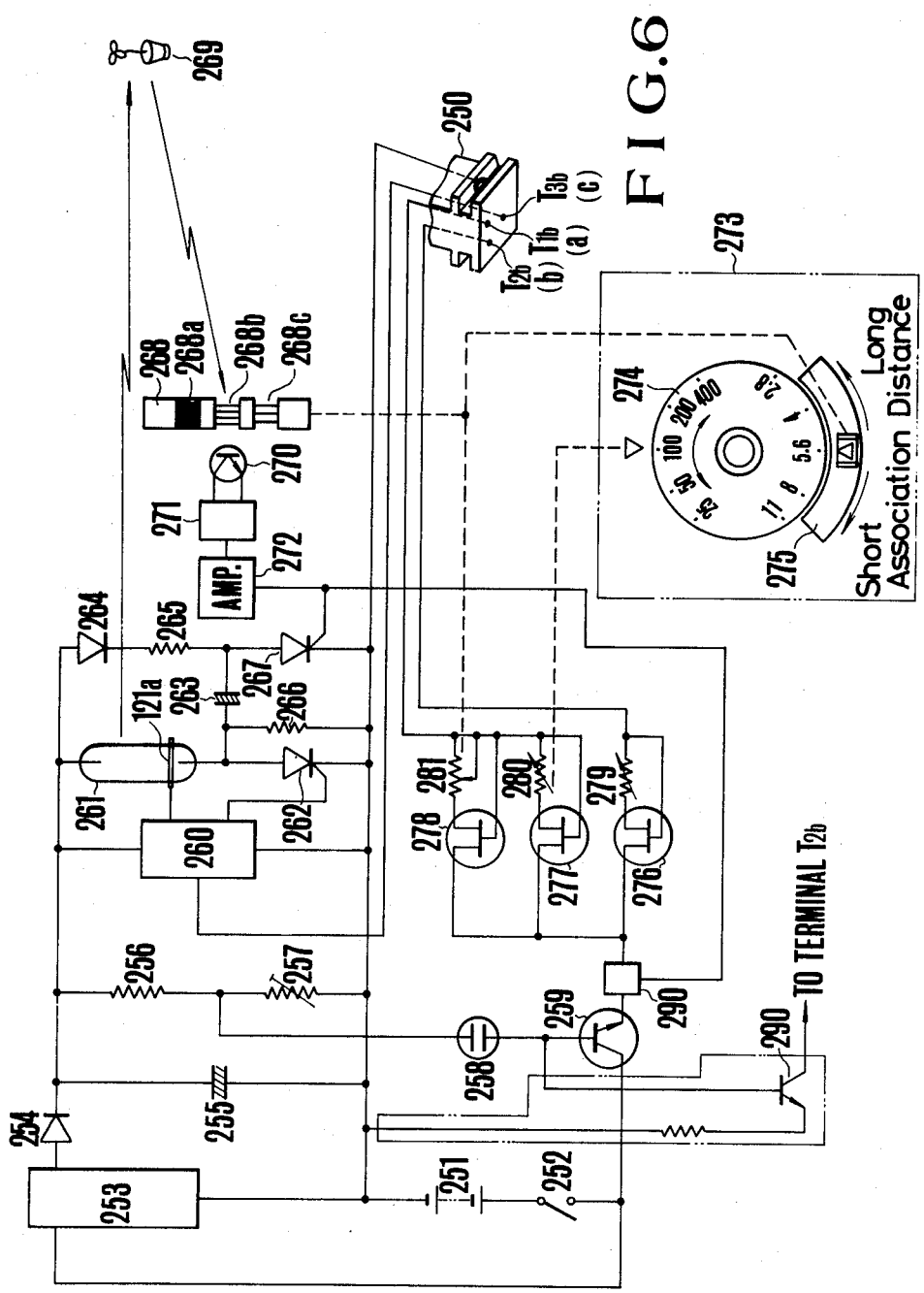
FIG. 6 shows an example of an electrical circuit of the flash light device shown in FIG. 4C.
Figure 4C:
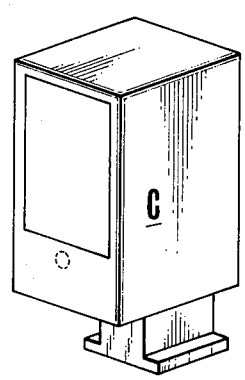

Below the flash light photography will be explained, whereby the flash light device C shown in FIG. 4C is mounted on the camera body A (FIGS. 1 to 3). The concrete circuit of the above mentioned flash light device C is shown in FIG. 6. Namely component 250 in FIG. 6 is the mounting foot to be connected with the contacts $T_1$, $T_2$ and $T_3$ in FIG. 4A whereby on the mounting foot 250 the terminals $T_{1b}$, $T_{2b}$ and $T_{3b}$ to be in contact with the terminals $T_1$, $T_2$ and $T_3$ at the side of the camera body. Component 251 is the current source, 252 the current source switch, 253 the voltage step up circuit for the current source 251, 254 the rectifying diode, 255 the main capacitor to be connected with the output terminal of the diode 254, 256 and 257 the resistances for forming a detecting circuit for detecting the terminal voltage of the main capacitor 255, 258 the neon tube connected with the connecting point of the resistances 256 and 257, 259 the transistor wh se base electrode is connected with the above mentioned neon tube 258 and 260 the conventional trigger circuit for generating the trigger pulse whose output terminal is connected with the trigger electrode 261a of the discharging tube 261 for producing a flash light and with the gate electrode of the silicon control rectifier (SCR) connected in the discharge circuit of the discharging tube 261. Component 263 is the capacitor, 264 the diode, and 265 and 266 the resistances whereby the diode 264 and the resistances 265 and 266 form a charging circuit for the capacitor 263. Component 267 is the SCR connected in the discharging circuit of the capacitor 263, 268 the aperture value setting filter group consisting of the ND filters 268a, 268b and 268c with different permeabilities, whereby the filters 268a, 268b and 268c are provided in front of the light sensing element for receiving the light beam of the discharge tube 261 reflected from the object 269 to be photographed. Component 271 is the integrating circuit for integrating the photo current flowing through the light sensing element 270 and producing the flash light interrupting signal when the total reflected light amount reaches a certain determined value, 272 the amplifier connected with the output terminal of the integrating circuit, whereby the output terminal of the amplifier 272 is connected with the gate electrode of the above mentioned SCR 267. Component 273 in the dotted line is the guide number setting part presenting a film sensitivity setting rotary plate 274 with graduated scale. The scale of this setting plate 274 can be set at the index. On the setting plate 274 an aperture value scale is graduated, whereby the index of the movable aperture value setting plate 275 can be set at the aperture value scale. Components 276, 277 and 278 are the field-effect transistors, 279 the resistance, 280 and 281 the variable resistances whereby the variable resistance 280 is set in accordance with the rotation amount of the film sensitivity setting plate 274. Further the variable resistance 281 is adjusted in accordance with the movement amount of the aperture value setting plate 275 while this aperture value setting plate 275 makes the filter group 268 slide in accordance with the movement amount of the plate 275.

Number 290 denotes the delay circuit connected between the emitter of the transistor 259 and the base of the field-effect transistor 276 whereby the input terminal of this circuit 290 is connected with the output terminal of the amplifier 272.

Below the operation of this flash light device C will be explained. When the flash light device C is mounted on the camera body A, the terminals $T_{1b}$, $T_{2b}$ and $T_{3b}$ of the mounting shoe are brought in contact with the terminals $T_1$, $T_2$ and $T_3$ of the hot shoe (FIG. 4) at the camera side. When then the current source switch 252 is closed the voltage of the battery 251 is step up and applied to the capacitor 255. In consequence the voltage between both terminals of the main capacitor 255 gradually goes up. When the terminal voltage of the main capacitor 255 reaches the charge completion voltage the neon tube 258 is brought in the conductive state so that the transistor 259 is brought in the switched on state. Thus the current is supplied to the above mentioned illuminating diode $L_2$ (FIG. 2) through 290, 276, 279 and terminal $T_{2b}$, $T_2$, so that the illuminating diode $L_2$ lights up. This indicates that the main capacitor 255 has been charged up to the charge completion voltage. Further, when the main capacitor 255 has been charged up to the charge completion voltage, the amplifier $A_4$ has been brought in the non operable state by means of the changing over circuit CHO shown in FIG. 3 and the amplifier as is enabled. In case for example, the numeral 100 marked on the film sensitivity setting plate 274 is set at the index, the value of the film sensitivity setting resistance 280 assumes the value corresponding to the film sensitivity 100. When then the index of the aperture value setting plate 275 is set for example, an aperture value 5.6, the filter group 268 moves sliding in front of the light sensing element 270 until in front of the light sensing element 270 a filter 268b corresponding to the aperture value F = 5.6 is arranged. Further the value of the aperture value setting variable resistance 279 assumes the value corresponding to the aperture value F = 5.6 set by the setting plate 275. Thus assuming that the current flowing through the variable resistance 281 is $ia$ and that flowing through the variable resistance 280 is $ib$, the signal current ($ia + ib$) namely the above mentioned In is put in the hot shoe HS $T_1$ through the terminal $T_{1b}$. When the above mentioned shutter button 7 is further pushed down, the diaphragm device 105 (FIG. 1) and the shutter are driven as explained above. With the opening operation of the shutter the synchronization switch $S_9$ is closed (FIG. 1). In this way, a signal is applied to the trigger circuit 260 through the terminal $T_3$, $T_{3b}$ while the trigger circuit 260 applies the trigger pulse to the discharge tube 261 as well as SCR 262. In consequence, the charge stored in the capacitor 255 is discharged through the discharge tube 261 and SCR so that the discharge tube 261 produces a flash light. When then the integrating circuit 271 produces a discharge interruption signal SCR 267 is opened so that SCR 262 is no more conductive so as to stop the operation of the discharge tube 261. The discharge interruption signal from the integrating circuit 271 controls the delay circuit 290 through the amplifier 272, which opens the circuit between the emitter of the transistor 259 and the source of FET 276 for a certain determined time. Thus the illuminating diode $L_2$ is put out for a certain time determined by the delay circuit 290 so as to indicate the discharge completion. The shutter closes after the elapse of the time determined by the resistance Rs and the capacitor $C_1$ as explained in accordance with FIG. 2. Hence the flash light photography is finished and the proper exposure is obtained.

Figure 7:
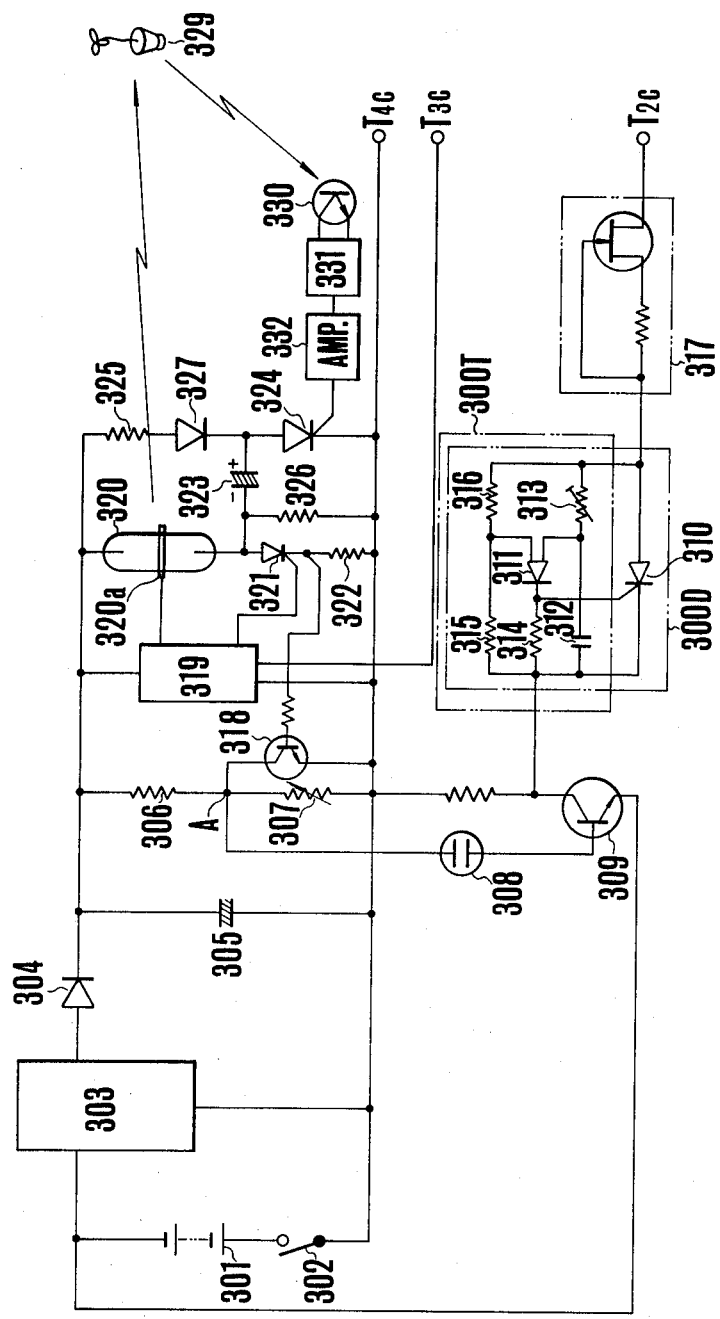
FIG. 7 shows another electrical circuit of the flash light device shown in FIG. 4C.

In FIG. 7, component 301 is the D.C. current source such as battery, 302 the current source switch, 303 the step up circuit for stepping up the voltage of the current source 301, 304 the rectifying diode connected with the output terminal of the step up circuit 303, 305 the main capacitor, 306 and 307 the resistances for forming the voltage dividing circuit, whereby 307 is the variable resistance for setting the divided voltage and 308 the charging completion indication lamp consisting for example of a neon tube connected with the voltage dividing point A of the voltage dividing circuit, whereby the lamp 308 is so designed as to light up when the terminal voltage of the main capacitor 305 reaches a certain determined value. Component 309 is the transistor whose base is connected with the charge completion indication lamp 308 and whose emitter and collector are connected with the current supply circuit of the holding circuit 300D to be explained later. Reference character 300D denotes the holding circuit which is connected with the current supply circuit of the above mentioned discharge completion indication diode $L_2$ (FIG. 2) so as to close the current supply circuit of the illuminating diode $L_2$ for a certain determined interval. The above mentioned holding circuit 300D presents a silicone control rectifying element (hereinafter called SCR) 310 and a conventional timing circuit 300T whereby the gate electrode of the above mentioned SCR 310 is connected with the programable unijunction transistor (hereinafter called PVT), 311 forming a timing unit 300. Further the above mentioned timing circuit 300T presents the capacitor 312, the variable condenser 313 as well as the resistances 314, 315 and 316 for forming a time constant circuit. Component 317 is the conventional constant current circuit, 318 the transistor whose collector electrode and emitter electrode are connected with both terminals of the variable resistance 307 forming the above mentioned voltage dividing circuit and 319 the conventional trigger circuit for producing the trigger pulse whose output terminal is connected with the trigger electrode of the discharge tube 320 and the gate electrode of the SCR connected parallel to the discharge tube 320, 322 is the resistance connected in series with SCR 321, 323 the capacitor for applying the inversed bias voltage to SCR 321, 324 the SCR connected in series with the capacitor 323, 325 and 326 the resistances, 327 the diode, 330 the light sensing element consisting for example, of a phototransistor for receiving the light beam reflected from the object 329 to be photographed, 331 the integrating circuit for integrating the output of the light sensing element 330, 332 the amplifying circuit for amplifying the output of the integrating circuit 331 and $T_{2c}$, $T_{3c}$ and $T_{4c}$ the terminals provided on the shoe mounting foot (not shown in the drawing).

Below the operation of the flash light device in FIG. 7 will be explained. When the flash light device in FIG. 7 is mounted on the hot shoe of the camera body A, the terminal $T_{2c}$ is connected with $T_2$, the terminal $T_{3c}$ with $T_3$ and the terminal $T_{4c}$ with the camera body. When the voltage at both terminals of the capacitor 305 reaches a certain determined value after the elapse of a certain determined interval after opening the current source switch 302 the neon tube 308 lights up so as to indicate the main capacitor 305 is fully charged. When the neon tube 308 lights up the transistor 309 is brought in the conductive state, whereby a current flows through the charge completion indication diode $L_2$ (FIG. 2) by means of the terminals $T_{2c}$ and $T_2$ light up. Then the front shutter plane 119 starts to run and the synchronization switch $S_9$ is closed, when a signal is applied to the trigger circuit 319 through the terminal $T_3$ and $T_{3c}$ in such a manner that the trigger circuit 319 produces a trigger pulse which triggers the discharge tube 320 and SCR whereby a discharge current runs through the discharge tube 320. In this way, the discharge tube 320 produces a flash light whereby the object 329 to be photographed is illuminated by this flash light. Whence the discharge current runs through the discharge tube 320 a voltage is produced between both terminals of the resistance 322 in such a manner that the transistor 318 is brought in the conductive state, when the neon tube 308 is put out. In consequence, the transistor 309 and the SCR 310 are brought in the non conductive state, so that the current supply circuit of the discharge completion indication diode $L_2$ is opened. In consequence the discharge completion indication diode $L_2$ is put out, indicating the completion of the discharge. When then the light amount reflected from the object 329 to be photographed reaches a certain determined value the integrating circuit 331 produces a pulse, when SCR 324 is brought in the conductive state while SCR 321 is brought in the non conductive state in such a manner that the discharge circuit of the discharge tube 320 is interrupted so as to stop the operation of the discharge tube 320. When the discharge tube 320 stops the operation the voltage of both terminals of the transistor 322 becomes zero, so as to be brought in the non conductive state again while the transistor 309 is rendered conductive, closing a part of the current supply circuit of the discharge completion indication diode $L_2$. However, at this time point the gate electrode of the SCR 310 has not yet being applied to with the positive pulse of the timing circuit 300T so that SCR 310 has not yet been brought in the conductive state. In consequence the illuminating diode $L_2$ is still out, indicating to the photographer the discharge completion of the flash light device. The timing circuit 300T is so adjusted as to produce a positive pulse at the output terminal for example, in three seconds after the start of the flash light. In consequence, after the elapse of three seconds after the start of the flash light SCR 310 is brought in the conductive state so that the illuminating diode $L_2$ lights up again.

By means of the flash light device shown in FIG. 7 the discharge completion diode $L_2$ is out for the interval set on the timing circuit 300T regardless of the distance from the object to be photographed, the photographer can recognize the indication by the discharge completion indication lamp without fail. It is constructed so that the charge completion and the discharge completion can be indicated by means of only one indication lamp, it is possible to offer an extremely effective indication device for a camera with little space. When a signal is produced at the terminal $T_{2c}$, the transistor $Tr_{10}$ (FIG. 2) is brought in the switched on state as explained above, whereby the resistance Rs is connected with the capacitor $C_1$. In consequence, the opening time of the shutter corresponds to the time constant established by the resistance Rs and the capacitor $C_1$ similarly to the case that the flash light device C in FIG. 6 is mounted on the camera. Hereby for the sake of the simple explanation the circuit for setting the aperture information is not mentioned in the flash light device shown in FIG. 7, whereby it goes without saying that the same aperture setting as that of the flash light device shown in FIG. 6 can be carried out, by connecting the circuits 277 – 281 shown in FIG. 6 with the anode of SCR 310 shown in FIG. 7, so as to apply the aperture information set in the circuits 277 – 281 to the comparator 180 (FIG. 3) through the terminal $T_1$ at the camera side.

For remote photography, the remote control unit D shown in FIG. D is mounted on the camera body A.

Figure 8:
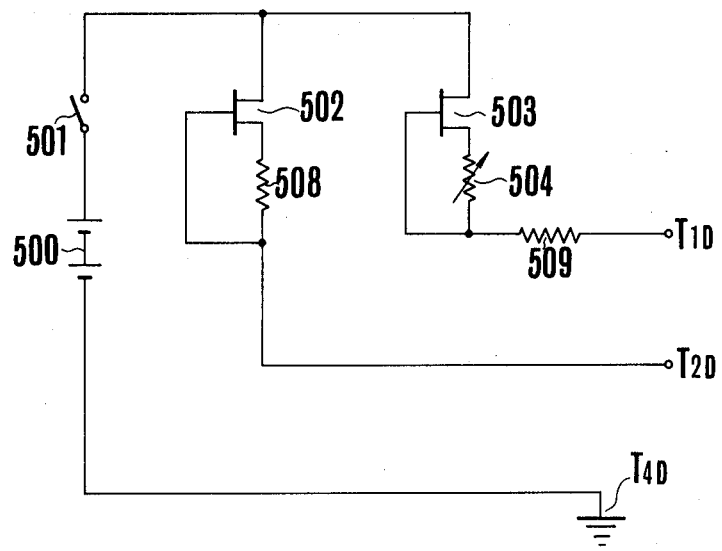
FIG. 8 shows the electrical circuit of the remote control unit shown in FIG. 4D.

The electrical circuit of the remote control unit D is shown in FIG. 8. In FIG. 8, 500 is the current source, 501 the main switch, 502 and 503 respectively the field-effect transistors and 504 the variable resistances to be set by the setting dial 506 provided on the remote control box 505. When now the remote part 507 is mounted on the camera shoe HS and the main switch 501 is closed. A certain determined value of the current is given to $T_2$ at the side of the camera from the terminal $T_{2D}$ so as to interrupt the amplifier $A_4$ and actuate the amplifier $A_5$ as explained above. When the dial 506 is set at the desired aperture value at the remote box 505, a current proportional to the set aperture value flows through the terminal $T_{1D}$, so as to automatically set the aperture value at the side of the camera body through the amplifier $A_5$.

Instead of mounting the flash light device C and the spot meter B directly on the camera body, it is possible to mount them on the extension part 602 of the extension unit F shown in FIG. 4F in order to actuate the flash light device or the measurement away from the camera. In the extension unit F only four core cables are to be provided.

The meter box E shown in FIG. 4E is the adapter to be used in case the spot meter B is used as a single meter, whereby the meter B is mounted on the shoe 701 so as to measure the aperture value by means of the output of the meter through the meter M built in the box 702.

Figure 10:
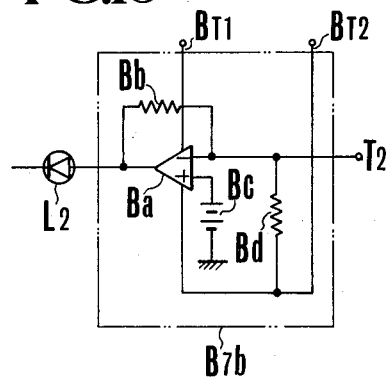
FIG. 10 shows a part of another variation of the circuit shown in FIG. 2.

In case of FIG. 2, the one terminal of the illuminating diode $L_2$ is directly connected with the terminal $T_2$, while it is possible to simplify the circuit of the attachments shown in FIGS. components 4B, 4C and 4D by providing the signal inversing circuit $B_{7b}$ between the illuminating diode $L_2$ and the terminal $T_2$, as is shown in FIG. 10. In FIG. 10, $L_2$ is the illuminating diode as shown in FIG. 2, Ba the operational amplifier, Bb the feed back resistance connected between the input terminal and the output terminal of the operational amplifier Ba and Bc the bias current source connected with the non inversed input terminal of the operational amplifier Ba whereby the negative electrode of the bias current source Bc is connected with the negative electrode of the current source E shown in FIG. 2. Component Bd is the resistance connected with the inversed input terminal of the amplifier Ba whereby the one current source terminal $BT_1$ of the amplifier Ba is connected with the negative electrode of the current source E shown in FIG. 2, while the other current source terminal $BT_2$ is connected with the collector electrode of the transistor $Tr_8$ shown in FIG. 2. When the signal inversing circuit $B_{7b}$ shown in FIG. 7 is connected with the circuit at the side of the camera body A, it is sufficient to cut the connecting wire between the terminal $T_{2aa}$ and the terminal $T_{2ab}$, by connecting the resistance 230 between the terminal $T_{2a}$ and the terminal $T_{4a}$ in the spot meter unit B shown in FIG. 5. Below the operation of the variation of the circuit shown in FIG. 2 as well as the variation of the circuit shown in FIG. 5 will be explained. When the spot meter unit B is mounted on the camera body, the terminals $T_1$ and $T_2$ are respectively connected with the terminals $T_{1a}$ and $T_{2a}$ as explained above. Thus, the inverted input terminal of the amplifier Ba (FIG. 10) is connected with the earth through the resistance 230 shown in FIG. 5 the potential of the output terminal of the amplifier Ba goes up. When instead of the control block $B_7$ shown in FIG. 2 the block $B_{7a}$ shown in FIG. 9 is used, the illuminating diode $L_2$ lights up so as to indicate that the spot meter unit B is mounted at the side of the camera. Further, in case the circuit $B_{7b}$ shown in FIG. 10 is connected with the circuit shown in FIG. 2 it is sufficient to connect the nPn transistor 290 with the flash light device C as is shown in the drawing and connect the collector of this transistor 290 with the terminal $T_{2b}$. It goes without saying that in the present case that the field effect transistor 276 as well as the resistance 279 should be put out.

Below the operation of the case that the flash light device C in whose circuit the transistor 290 is connected is connected with the camera body A presenting the signal inversing circuit $B_{7b}$ shown in FIG. 10 will be explained. Because the inversed input terminal of the amplifier Ba is connected with the earth through the transistor 290, the potential of the output terminal of the amplifier Ba goes up, so as to make the illuminating diode $L_2$ light up. Other operation are same as mentioned above and therefore omitted here. Further it is sufficient to connect the terminal $T_{2D}$ of the remote control unit D with the negative electrode of the current source 500 (FIG. 8) through the resistance (not shown in the drawing). It goes without saying that in the present case the field effect transistor 502 and the resistance 508 can be put off. The operation of the signal inversing circuit $B_{7b}$ (FIG. 10) is same as that of the spot meter unit and therefore omitted here.

The spot meter unit B shown in FIG. 4B as well as FIG. 5 is of the type for receiving the light beam reflected from the object to be photographed whereby in case of this type the exposure amount is often influenced by the reflection factor of the object to be photographed. In order to avoid this shortcoming it is sufficient to adopt the conventional light measuring unit of the incident light system in such a manner that the automatic exposure control device (FIG. 1 to FIG. 3) at the side of the camera body A by controlled by means of the signal from this light measuring unit. In this way, it is possible to obtain a very proper exposure in case of taking photograph in a studio and so on. The above mentioned spot meter unit does not always means a unit that measures the brightness on an extremely small portion of the object to be photographed, but also ones which measure the brightness of a certain specified portion of the object to be photographed or mainly the brightness of the central part.

The composition being as explained above, the following effects can be expected from the present invention.

(1) By mounting the spot meter unit B on the camera the light beam coming from a certain specified portion of the object to be photographed is measured in such a manner that the exposure amount is controlled by the light measurement signal so that it is no more necessary to alter the step number of the exposure amount basing upon the experience as before. In consequence by means of this camera system even an unexperienced person can obtain a proper exposure amount of such an object to be photographed as is in the back light state. (2) By means of the changing over circuit CHO, the light measuring circuit at the side of the spot meter unit B can automatically be connected with the exposure amount determining device $B_2$, replacing the light measuring circuit $B_1$ at the side of the camera there is no possibility for misoperation. (3) By means of mounting various kinds of the attachments directly or indirectly by means of cable and the like on the camera body the exposure value such as the aperture and so on at the side of the camera is set at the proper value for the operation mode of the mounted attachment, so that it is possible to take photographs or carry out measurements in a wide range of the photographic mode with the camera body and various kinds of the attachments. Thus the system in accordance with the present invention is very effective for realizing systematical camera while there is no possibility for misoperation because the system can be realized with minimum components at the side of the camera body.

What is claimed is:

1. In a camera having a plurality of exposure control circuits for various photographing modes, a hot shoe for the attachment of one of a plurality of additional units including an information input terminal for adjustment of an exposure time suitable for flash photography, the improvement comprising:
    (a) said hot shoe having a changeover signal input terminal for connection to the respective output terminal of the attached one of the additional units; and
    (b) a switchover arrangement connected to said changeover signal input terminal for automatically enabling the exposure control circuit corresponding to the attached one of the units, in response to a kind of changeover signal from the selectively attached additional unit, said changeover signal having different values for different attachments.

2. A camera couplable to attachment units each including at least a first terminal for supplying a selector signal and a second terminal for supplying an information signal, said selector signal to be generated in the first terminal of each of said attachment units having an individual value;
    said camera comprising:
    (a) aperture size determining means
    (b) aperture size control means coupled to said determining means for controlling said aperture size determining means,
    (c) shutter control means for adjusting an exposure time,
    (d) adjustable timing means coupled to the shutter control means,
    (e) connecting means mounted on the camera, said connecting means having one selector terminal capable of being connected with the first terminal of said respective attachment unit and one information terminal capable of being connected with the second terminal of said respective attachment unit,
    (f) first selector means connected with the selector terminal of said connecting means for alternately applying to said aperture size determining means the information signal at the information terminal of said connecting means or a signal generated in said aperture size control means corresponding to the selector signal applied to said selector terminal, and
    (g) second selector means connected with the selector terminal of said connecting means for setting the said adjustable timing means to a value corresponding to the signal applied to the selector terminal.

3. A camera as in claim 2, wherein said adjustable timing means includes a time constant circuit.

4. A camera as in claim 2, wherein said adjustable timing means includes a capacitor and resistors.

5. A system, comprising a camera and a plurality of attachment units for the camera, said attachment units each having at least a first terminal for supplying a change over signal and a second terminal for supplying an information signal, said change over signal to be generated in the first terminal of respective attachment unit being adapted to have individual levels different from one another,
    said camera including:
    (a) aperture size determining means,
    (b) aperture size control means coupled to said determining means for controlling said aperture size determining means,
    (c) shutter control means for adjusting an exposure time,
    (d) adjustable timing means coupled to the shutter control means,
    (e) connecting means mounted on the camera, said connecting means having one changeover terminal capable of being connected with a first terminal of each of said attachment units and one information terminal capable of being connected with a second terminal of each of said attachment units,
    (f) a first changeover means connected with the changeover terminal of said connecting means for alternately applying to said aperture size determining means the information signal applied to the information signal of said connecting means or a signal generated in said aperture size control means corresponding to the kind of the changeover signal applied to the changeover terminal, and
    (g) a second changeover means connected with the changeover terminal of said connecting means for setting said adjustable timing means to a value corresponding to the kind of the changeover signal applied to the changeover terminal, the second changeover means having a threshold level different from the threshold level of the first changeover means.

6. A system, comprising a camera and a flash unit as well as a light measuring unit alternately attachable to the camera;
    said flash unit having at least a first terminal for transmitting a first changeover signal and second terminal for transmitting a first information signal;
    said light measuring unit having a third terminal for transmitting a second changeover signal having a level different from that of the first changeover signal and a fourth terminal transmitting a second information signal; said camera including:
    (a) aperture size determining means,
    (b) aperture size control means coupled to said determining means for controlling said aperture size determining means,
    (c) shutter control means for adjusting an exposure time,
    (d) adjustable timing means coupled to the shutter control means,
    (e) connecting means mounted on the camera, said connecting means having one changeover terminal alternately connected with the first terminal of said flash unit and the third terminal of said light measuring unit as well as one information terminal alternately connected with the second terminal of said flash unit and the fourth terminal of said light measuring unit depending on which unit is mounted on the camera;
    (f) first changeover means connected with the changeover terminal of said connecting means for alternately applying to said aperture size determining means the information signal applied to the information terminal of said connecting means or a signal generated in said aperture size control means corresponding to the kind of changeover signal applied to the changeover terminal, and (g) a second changeover means connected with the changeover terminal of said connecting means for setting said adjustable timing means to a value corresponding to the kind of changeover signal applied to the changeover terminal.

7. A system comprising a camera, a flash unit and a light measuring unit alternatively attachable to the camera, said flash unit having at least a first terminal for transmitting a first changeover signal and a second terminal for transmitting a first information signal;

said light measuring unit having a third terminal for transmitting a second changeover signal and a fourth terminal for transmitting a second information signal;

said camera including:
(a) aperture size determining means,
(b) aperture size control means coupled to said aperture size determining means for controlling said aperture size determining means,
(c) shutter control means for adjusting an exposure time,
(d) first timing means for controlling said shutter control means corresponding to the exposure time determined by said flash unit,
(e) second timing means for controlling said shutter control means,
(f) first changeover means connected with the changeover terminal of said connecting means for applying the first information signal to said aperture size determining means upon the first changeover signal being transmitted to the changeover terminal and applying the second information signal to said aperture size determining means upon the second changeover signal being transmitted to said changeover terminal, and
(g) a second changeover means connected with the changeover terminal of said connecting means for coupling said first timing means with said shutter control means upon the first changeover signal being transmitted to said changeover terminal and coupling said second timing means with said shutter control means upon the second changeover signal being transmitted to the changeover terminal.

8. A system comprising a camera, a flash unit and a remote control unit both alternately attachable to the camera, said flash unit having at least a first terminal for transmitting a first changeover signal and a second terminal for transmitting a first photographic information signal;

said remote control unit having at least a third terminal for transmitting a second changeover signal and a fourth terminal for transmitting a second photographic information signal;

said camera including:
(a) aperture size determining means,
(b) aperture size control means coupled to said determining means for controlling said aperture size determining means,
(c) shutter control means for adjusting an exposure time,
(d) a first timing means for controlling said shutter control means corresponding to the exposure time determined by said flash unit,
(e) second timing means for controlling said shutter control means,
(f) first changeover means connected with the changeover terminal of said connecting means for applying the first photographic information signal to said aperture size determining means upon a first changeover signal being transmitted to the changeover terminal and applying the second photographic information signal to said aperture size determining means upon the second changeover signal being transmitted to the changeover terminal and
(g) second changeover means connected with the changeover terminal of said connecting means for coupling said first timing means with said shutter control means upon the first changeover signal being transmitted to the changeover terminal, and coupling said second timing means with said shutter control means upon the second changeover signal being transmitted to the changeover terminal.

9. A combination of a camera and at least one attachment unit for the camera, said attachment unit having a first terminal for transmitting a predetermined changeover terminal and a second terminal for transmitting a photographic information signal;

said camera including:
(a) aperture size determining means,
(b) aperture size control means coupled to said aperture size determining means for controlling said aperture size determining means,
(c) shutter control means for adjusting an exposure time,
(d) adjustable timing means connected with the shutter control means,
(e) connecting means mounted on the camera, said connecting means having one changeover terminal capable of being connected with the first terminal of said attachment unit and one information terminal capable of being connected with the second terminal of said attachment unit,
(f) first changeover means connected with the changeover terminal of said connecting means for alternately applying to said aperture size determining means the photographic information signal applied to the information terminal of said connecting means or a signal generated in said aperture size control corresponding to the changeover signal and
(g) second changeover means connected with the changeover terminal of said connecting means for setting the content of said adjustable timing means to a predetermined value corresponding to the changeover signal applied to the changeover terminal.

* * * * *